United States Patent
Eastwood et al.

(10) Patent No.: US 7,082,856 B1
(45) Date of Patent: Aug. 1, 2006

(54) WIRE STRIPPER SYSTEM

(75) Inventors: Kenneth Brian Eastwood, Fort Collins, CO (US); Sondra Kay Eastwood, Fort Collins, CO (US)

(73) Assignee: E5 Products, Inc., Fort Collins, CO (US)

( * ) Notice: Subject to any disclaimer, the term of this patent is extended or adjusted under 35 U.S.C. 154(b) by 0 days.

(21) Appl. No.: 11/152,307

(22) Filed: Jun. 14, 2005

(51) Int. Cl.
*B26B 27/00* (2006.01)

(52) U.S. Cl. ............................ 81/9.4; 81/9.41; 81/9.51; 30/90.1

(58) Field of Classification Search ................... 81/9.4, 81/9.51, 9.41–9.44; 30/90.1–90.4
See application file for complete search history.

(56) References Cited

U.S. PATENT DOCUMENTS

| | | | | |
|---|---|---|---|---|
| 4,059,892 A | * | 11/1977 | Siden | 30/90.1 |
| 4,060,891 A | * | 12/1977 | Lerner | 30/90.1 |
| 4,117,749 A | * | 10/1978 | Economu | 30/90.6 |
| 4,805,301 A | * | 2/1989 | Chapin et al. | 30/90.1 |
| 4,850,108 A | * | 7/1989 | Perrino et al. | 30/90.4 |
| 5,140,873 A | * | 8/1992 | Schwartzman | 81/9.43 |
| 5,306,378 A | * | 4/1994 | Takimoto et al. | 156/344 |
| 5,398,413 A | * | 3/1995 | Chen | 30/90.1 |
| 6,089,125 A | * | 7/2000 | Cheng | 81/9.44 |
| 6,334,253 B1 | | 1/2002 | Cheng | |
| 6,473,925 B1 | | 11/2002 | Konen | |
| 6,618,885 B1 | | 9/2003 | Blaustein | |
| 6,662,450 B1 | | 12/2003 | Ducret | |
| 6,718,638 B1 | * | 4/2004 | Liaw | 30/90.7 |
| 6,718,848 B1 | | 4/2004 | Liversidge | |
| 6,736,032 B1 | | 5/2004 | Hombu | |
| 6,739,217 B1 | | 5/2004 | Hartranft et al. | |
| 6,799,383 B1 | | 10/2004 | Wiley | |
| 6,898,997 B1 | | 5/2005 | Oldigs et al. | |

* cited by examiner

*Primary Examiner*—Lee D. Wilson
*Assistant Examiner*—Anthony Ojini
(74) *Attorney, Agent, or Firm*—CR Miles P.C.; Craig R. Miles

(57) ABSTRACT

A wire stripper having at least two resiliently flexible blades each of which terminate in an insulator stripper disposed in opposed relation operably responsive to a slidly engaged insulated wire to release the insulator from the wire.

9 Claims, 12 Drawing Sheets

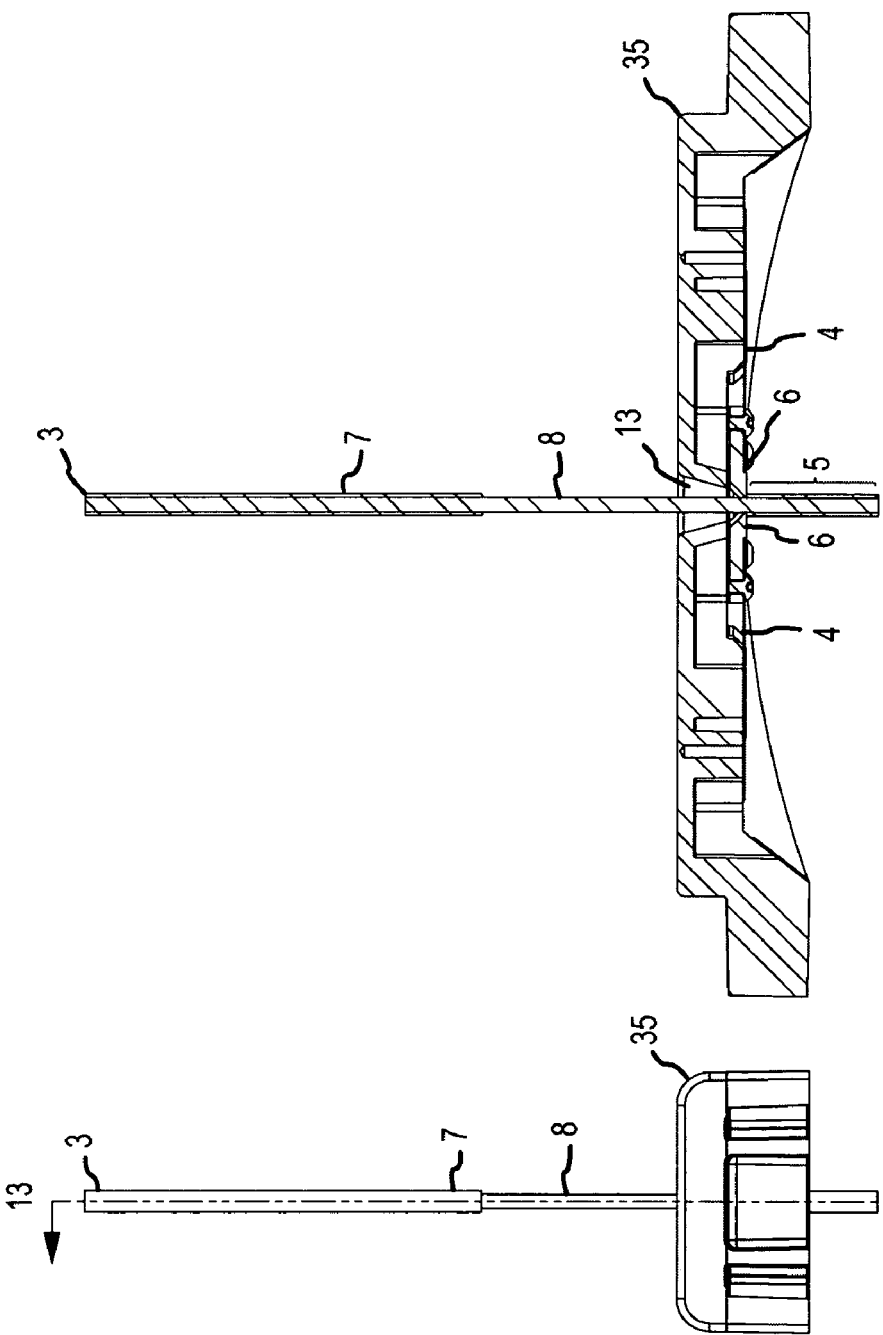

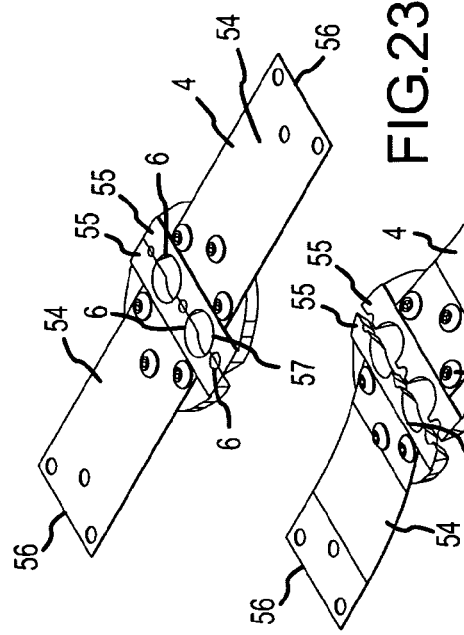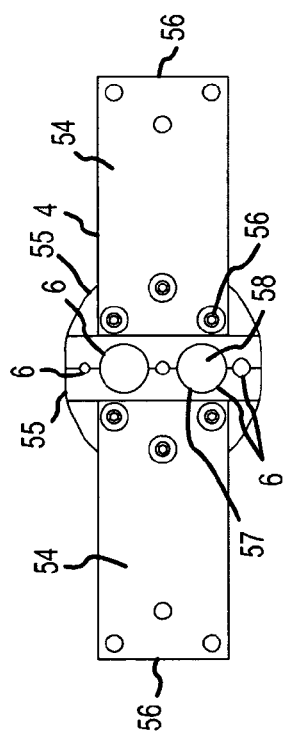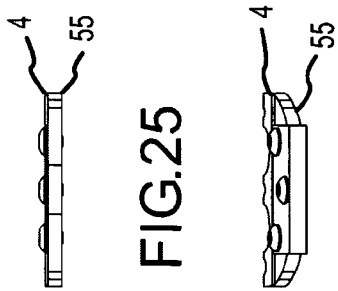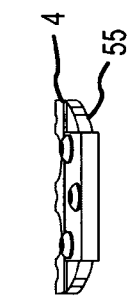

WIRE STRIPPER SYSTEM

I. BACKGROUND

A wire stripper having at least two resiliently flexible blades each of which terminate in an insulator stripper disposed in opposed relation operably responsive to a slidly engaged insulated wire to release the insulator from the wire.

Electrician's must be able to draw a numerous and wide variety of insulated wires to address the construction specifications of a given construction project. Each type of insulated wire may be wound onto spools from which lengths are cut to the construction specification. The insulator at the ends of the cut lengths of insulated wire must be released to expose the wire(s) within so that electrically conductive connections can be established between lengths of insulated wire drawn at the construction project.

Even though there is a large commercial market for wire stripper devices to assist users in releasing the insulator from insulated wire, there remain a number of significant unresolved problems with the conventional wire stripper devices available to release the insulator from the numerous and varied types of insulated wire.

A significant problem with conventional wire stripper devices can be that the wire stripper components which engage the insulated wire must be operated by hand. One aspect of this problem can be that the user has only one hand free to manipulate insulated wires which require stripping. The use of a single hand to repeatedly manipulate a large number of insulated wires to release the insulator may place an excess amount of stress on connective tissue or the joints of the delegated hand and arm of the user and under some circumstances may result in repetitive stress injury. Another aspect of this problem can be that the user must manually open and close the component parts of conventional wire stripper devices and then release the insulator from the insulated wire which can be time consuming. Another aspect of this problem can be that the insulator on certain types of insulated wire may require application of a greater amount of force to release than can be practically applied utilizing certain conventional hand held devices.

Another problem with conventional wire stripper devices may be that the wire stripper components which engage the insulator of the insulated wire are exposed during operation and can be a source of possible injury to the user. One aspect of this problem can be that conventional stripper components when used can be opened to expose a space between the cutter surfaces which can be substantially larger than the diameter of the insulated wire being stripped of the insulator. For example, the exposed space between the cutter surfaces can be sufficiently large for insertion of a portion of a hand or finger. Another aspect of this problem can be that the exposed stripper components can be susceptible to damage either during use or during storage.

Another problem with conventional wire stripper devices may be that the location of conventional stripper components relative to the user during operation may limited. Hand held wire strippers for example do not allow the stripper components to be variably located for operation outside of the hand of the user at all and when conventional wire stripper devices are operated in the hand of a user the location of the wire stripper is limited to the range afforded by the anatomy of the user.

The wire stripper invention described herein addresses each of these problems associated with conventional wire stripper devices.

II. SUMMARY OF THE INVENTION

Accordingly, a broad object of the invention can be to provide a wire stripper having at least two resiliently flexible blades each of which terminate in an insulator stripper disposed in opposed relation operably responsive to a slidly engaged insulated wire to release the insulator from the wire.

Another broad object of the invention can be to provide a wire stripper which can be operated without being held in the hand of a user by slidly inserting the insulated wire between at least two resiliently flexible blades each having a terminal insulator stripper disposed in opposed relation which operate to release the insulator from the wire.

Another broad object of the invention can be to provide a wire stripper having at least two resiliently flexible blades each of which terminate in an insulator stripper disposed in opposed relation which are not substantially exposed while operating to slidly engage an insulated wire to release the insulator from the wire.

Another broad object of the invention can be to provide a wire stripper which allows the user to variably locate insulator stripper components relative to the user or the support surface on which the wire stripper is secured.

Naturally, further objects of the invention are disclosed throughout other areas of the specification, drawings, photographs, and claims.

III. A BRIEF DESCRIPTION OF THE DRAWINGS

FIG. 12 is a side view of a portion of the handle of particular embodiment of the invention showing cross section 13—13.

FIG. 13 is cross section 13—13 shown by FIG. 12 having the blades established in the open position.

FIG. 19 is a front view of a particular embodiment of the blades of the invention in the open position.

FIG. 20 is a back view of a particular embodiment of the blades of the invention in the closed position.

FIG. 21 is a side view of a particular embodiment of the blades of the invention in the closed position.

FIG. 22 is a side view of a particular embodiment of the blades of the invention in the open position.

FIG. 23 is a perspective view of a particular embodiment of the blades of the invention in the closed position.

FIG. 24 is a perspective view of a particular embodiment of the blades of the invention in the open position.

FIG. 25 is an end view of a particular embodiment of the blades of the invention in the closed position.

FIG. 26 is an end view of a particular embodiment of the blades of the invention in the open position.

IV. DETAILED DESCRIPTION OF THE PREFERRED EMBODIMENTS

A wire stripper having at least two resiliently flexible blades each of which terminate in an insulator stripper disposed in opposed relation operably responsive to a slidly engaged insulated wire to release the insulator from the wire.

Figure 1:
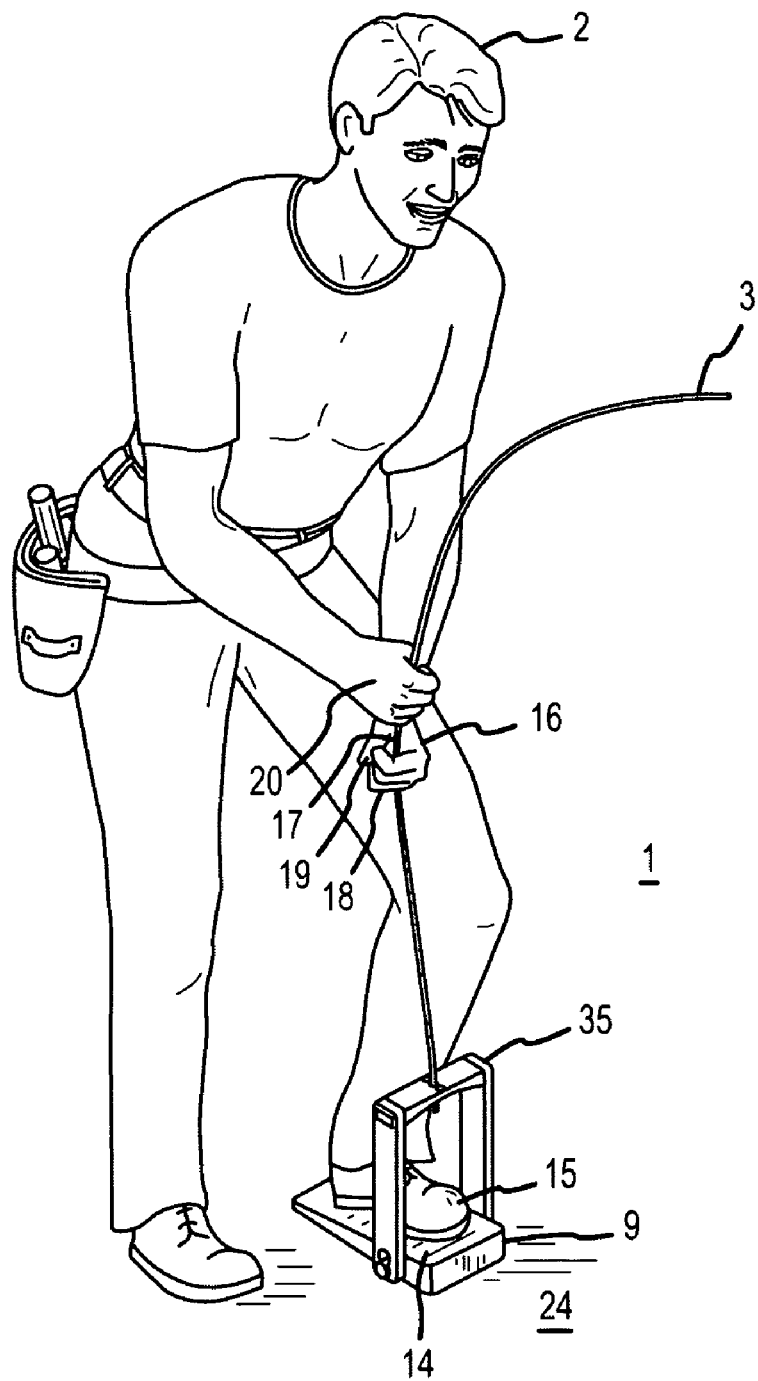
FIG. 1 is an illustration of a method of using an embodiment of the invention.
Figure 2:
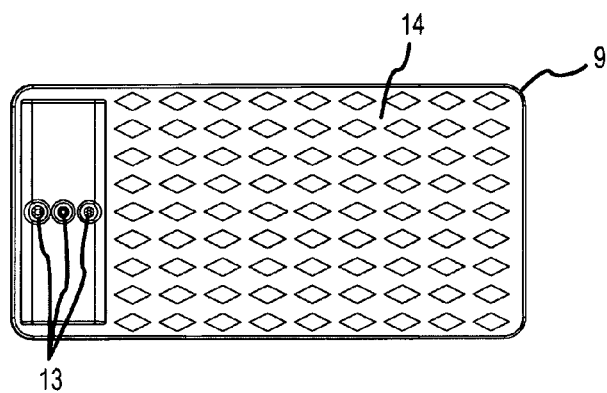
FIG. 2 is a top view of a particular embodiment of the invention.

First referring primarily to FIG. 1, a particular method of using an embodiment of the wire stripper invention (1) is shown. A wire stripper user (2) can slidly locate an insulated wire (3) between at least two resiliently flexible blades (4) each of which terminate in a insulator stripper (6) disposed in opposed relation to establish a portion of the insulated wire (5) projecting beyond each terminal insulator stripper (6) (as shown by the non-limiting example of FIG. 11). By subsequent action of the wire stripper user (2) to release the insulated wire (3) from engagement of the at least two resilient flexible blades (4), each insulator stripper (6) travels to close upon the insulator (7) of the insulated wire (3)(as shown by FIG. 13) to release the insulator (7) from the portion of insulated wire (5) projecting beyond the terminal of each insulator stripper (6). The wire (8) can be slidly removed substantially avoiding contact with each insulator stripper (6) disposed in closed opposed relation (as shown by FIG. 13). The released insulator (7) can be displaced from the insulator stripper (6) by force of gravity or by engagement with the wire stripper user (2).

The term "wire" as used herein generically encompasses the numerous and varied types of material including various types of metal (such as copper or aluminum), plastic (such as photonic fiber(s)), or glass which may be configured as slender rods, fibers, strands, cables, cords, or the like, whether electrically conductive or non-electrically conductive, regardless of any particular diameter or area in cross section.

The term "insulator" as used herein generically encompasses the numerous and varied materials which are poor conductors of electricity, or are used to separate or isolate conducting materials to prevent transfer of electricity, or are used to protect "wire(s)" as above-described, or which can be established about electrically conductive or electrically non-conductive "wire(s)". Non-limiting examples of an "insulator" in accordance with the invention comprise fiberglass, polyvinyl chloride, nylon, polypropylene, Dacron®, Nomex®, Kevlar®, Spectra®, silicon rubber, vinyl, acrylic, fluoropolymer, TFE, FEP, PFA, Teflon®, or the like, whether configured as a continuous layer(s) of insulator (smooth or convoluted), a sleeve, spiral wrapped, braided, or the like.

The term "insulated wire" as used herein includes, without limitation, a "wire" (as above-described) having an "insulator" (as above described) which covers a portion of the surface of such wire.

Figure 3:
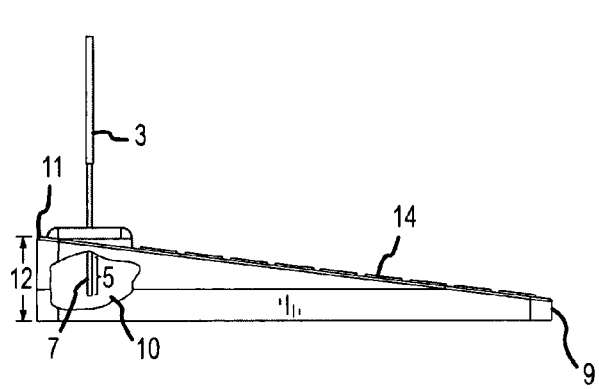
FIG. 3 is a side view of a particular embodiment of the invention.
Figure 4:
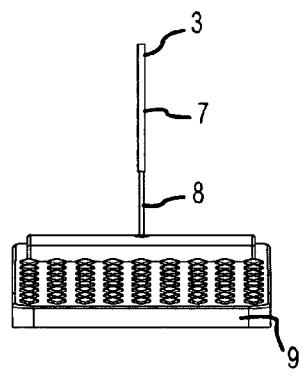
FIG. 4 is a front view of a particular embodiment of the invention.
Figure 11:
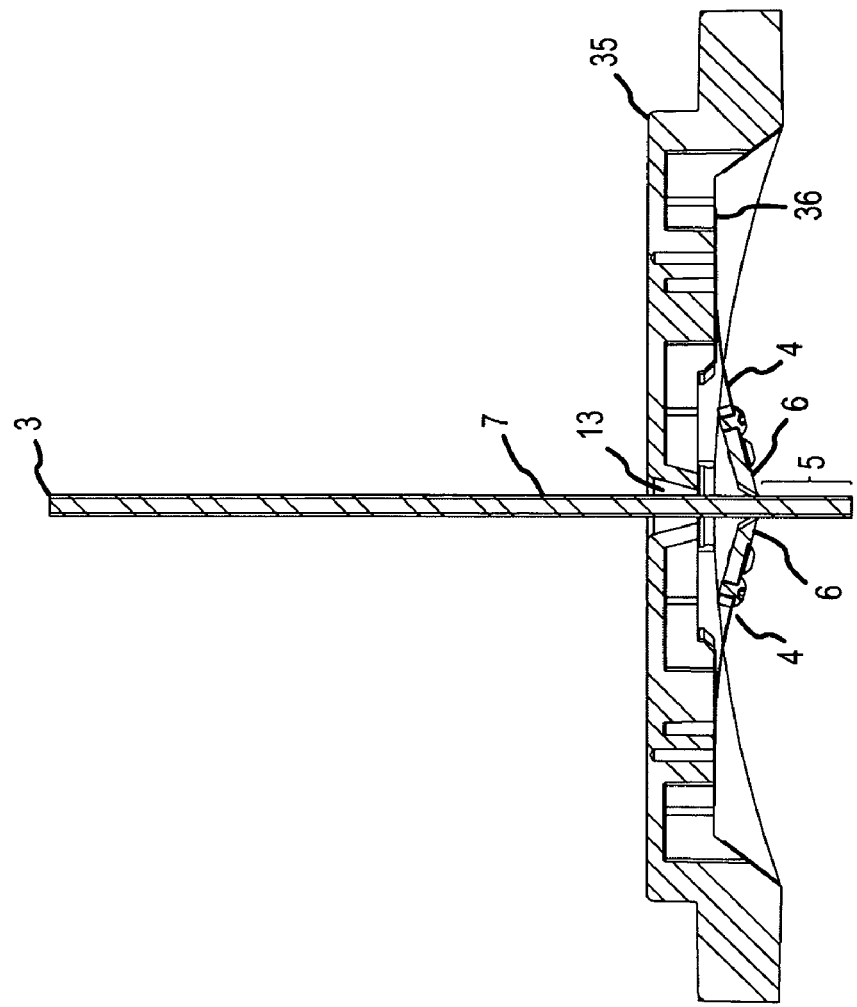
FIG. 11 is cross section 11—11 shown by FIG. 10 having the blades slidly engaged with an insulated wire.
Figure 10:
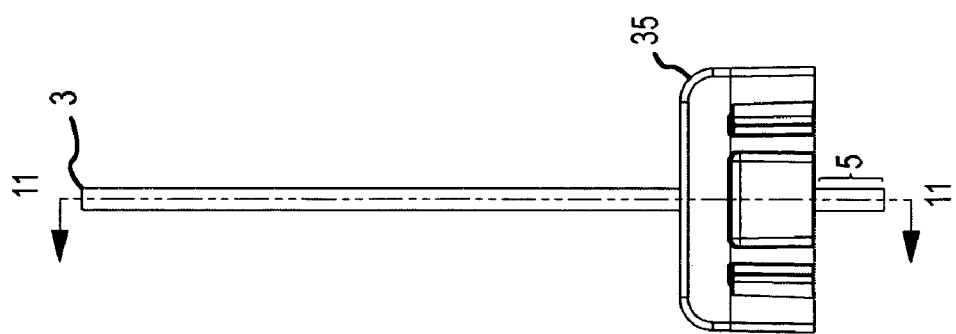
FIG. 10 is a side view of a portion of the handle of particular embodiment of the invention showing cross section 11—11.

Now referring primarily to FIGS. 2, 3, 4, and 5 which show a particular non-limiting embodiment of the wire stripper invention (1) which includes a stand (9) to which the at least two resiliently flexible blades (4) can be disposed in opposed relation (similar to FIG. 11). As shown by FIG. 3, the stand (9) can provide a hollow interior (10). A first stand end (11) can have sufficient height (12) to allow the insulated wire (3) to slidly engage between the at least two flexible blades (4) to establish a portion of the insulated wire (5) projecting beyond each terminal insulator stripper (6) within the hollow interior of the stand (9). As above-described the insulator (7) can be released by action of the user (2) to withdraw the insulated wire from the at least two resiliently flexible blades (4).

At least one wire insertion aperture (13) (as shown for example by FIGS. 2 and 11) communicating between the exterior and interior of the stand (9) can be aligned with the at least two flexible blades (4) to allow an insulated wire (3) to be inserted through the at least one wire insertion aperture (13) of the stand (9) to slidly engage each terminal wire stripper (6) as above-described. Alternate embodiments of the invention, can provide a stand (9) configured to expose a portion of the at least two resiliently flexible blades (4) in a manner which allows the insulated wire (3) to be inserted between the at least two blades (4), as above-described.

The embodiment of the wire stripper invention (1) shown by FIGS. 2–5 provides a stand (9) having triangular geometry which establishes a force application surface (14) on which the wire stripper user (2) can place a foot (15) to generate sufficient force to oppose the action of the wire stripper user (2) to remove the insulated wire (3) from engagement of the at least two resilient flexible blades (4) and displace the insulator (7) from the portion of the wire (5) projecting beyond each terminal insulator stripper (6).

As a second non-limiting example, the stand (9) can be configured to provide a force application surface (14) which conforms or accommodates a portion of the first hand (16) of the wire stripper user (2). As to that particular embodiment of the invention, the wire stripper user (2) can exert force on the force application surface (14) with a portion of the palm (17) or fingers (18) of the first hand (16) while exerting an opposing force on the insulated wire (3) with the second hand (20) to remove the insulated wire from the at least two resilient flexible blades (4) to displace the insulator (7) from the portion of the wire (5) projecting beyond each terminal insulator stripper (6).

As a third non-limiting example, the stand (9) can be configured to be held between the fingers (18) and thumb (19) of a first hand (16) while the second hand (20) generates a sufficient opposed force to remove the insulated wire (3)

from the at least two resilient flexible blades (4) to displace the insulator (7) from the portion of the wire (5) projecting beyond each terminal insulator stripper (6).

Understandably, the stand (9) can be established in a variety of geometric configurations to accommodate the numerous and varied applications of wire stripper invention (1) and the example of the triangular geometry above-described or the geometry conformed to the hand or fingers of the wire stripper user are not intended to be limiting but rather illustrative of how to make and use various alternate embodiments of a stand (9) to which the at least two resilient flexible blades (4) can be coupled to operate as above-described.

Figure 5:
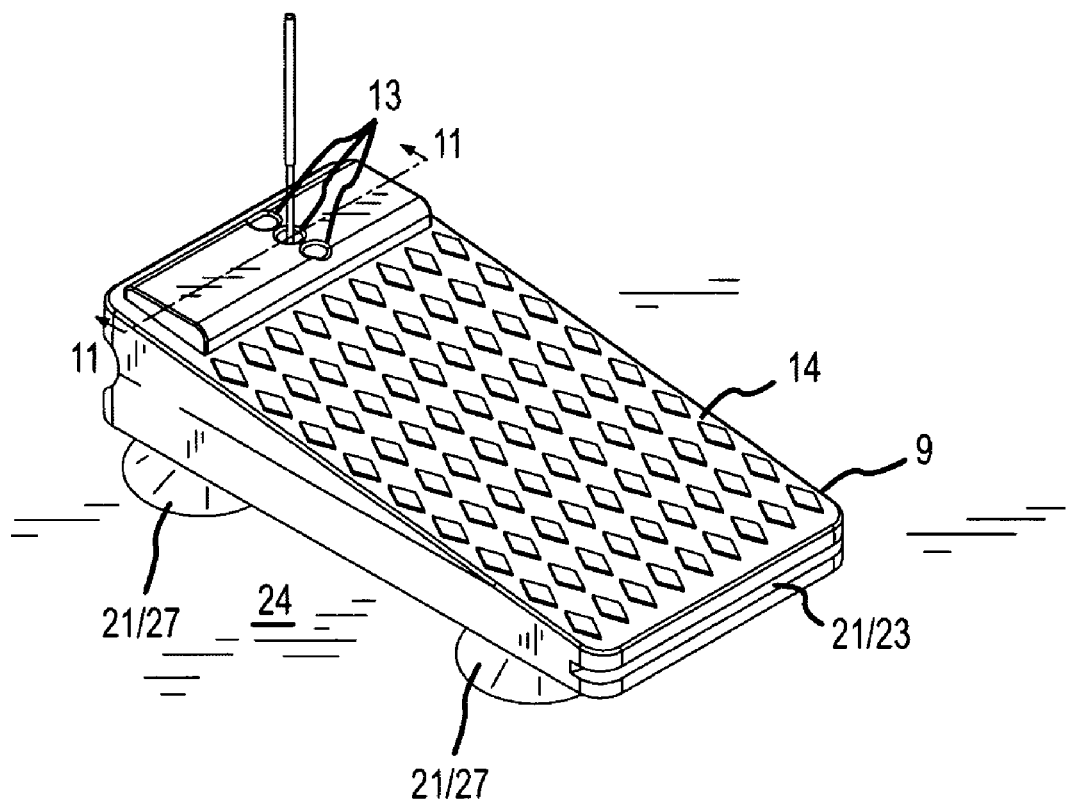
FIG. 5 is a perspective view of a particular embodiment of the invention.
Figure 6:
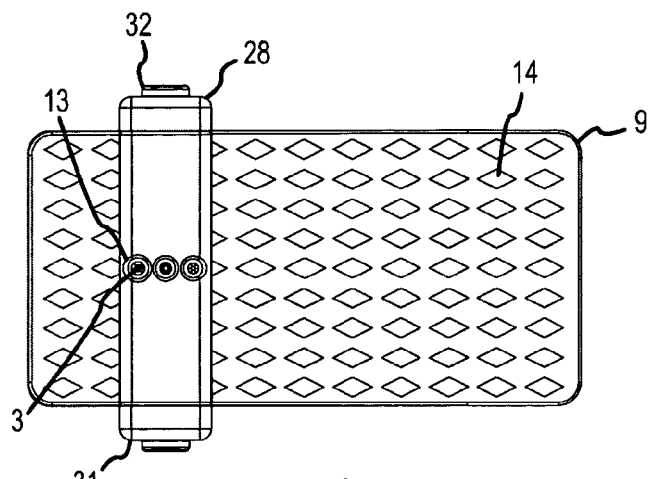
FIG. 6 is a top view of a particular embodiment of the invention having a rotatable handle established a second fixed location.
Figure 27:
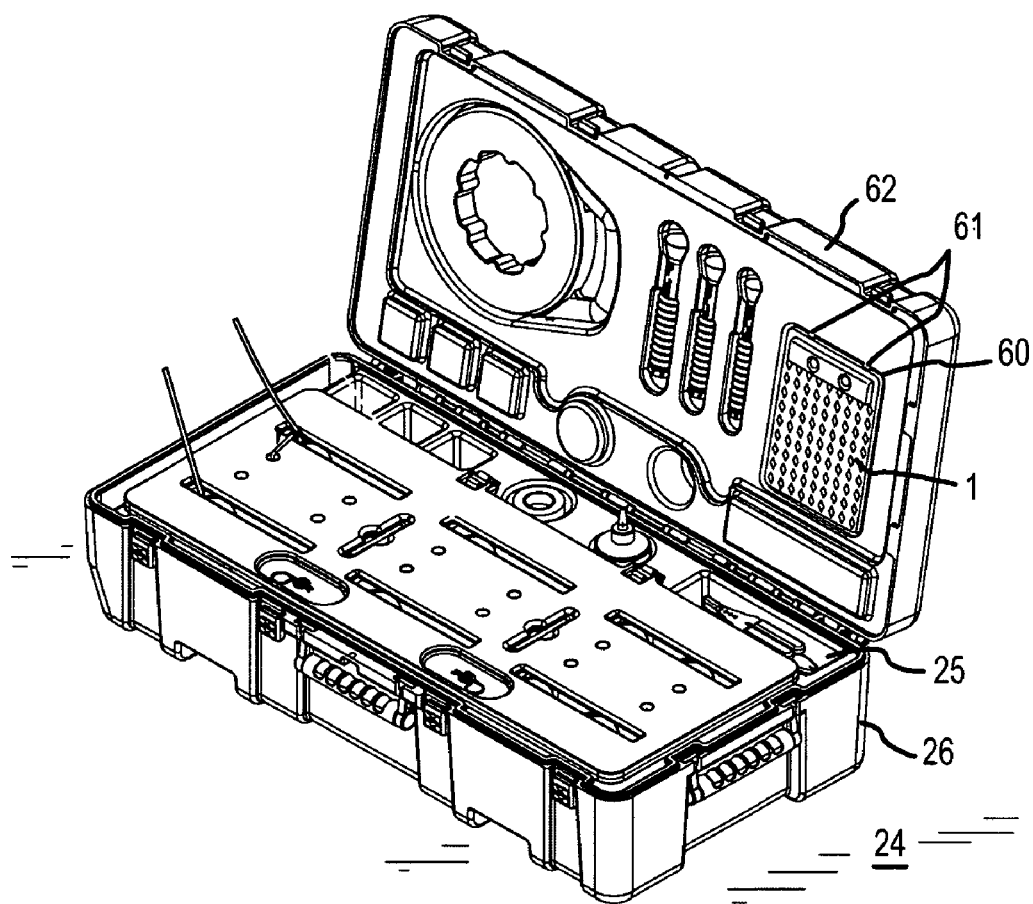
FIG. 27 is a perspective view of an alternate particular embodiment of the invention secured to a case.

The stand (9) can further include securement means (21) which fix the stand (9) to a location. The securement means as shown by FIGS. 5 and 27 can be detents (22) which mate with a catch element (23) of the stand (9). Alternately, securement means can include suction cups (27) connected to the stand (9) which engage a support surface (24), a recess (25) in a case (26)(as shown by FIG. 27) which mates with a portion of the stand (9), or other types of securement means such as a clamps, mechanical fasteners, or the like.

Now referring to FIGS. 6, 7, 8, and 9 which show an alternate embodiment of the wire stripper invention (1) having a stand (9) which further includes a handle (28) to which the at least two resilient flexible blades (4) each having a terminal insulator stripper (6) can be coupled. The handle (28) allows the at least two resilient flexible blades (4) to be located at a position relative to the user (2) or to the stand (9), or both, which allows the user (2) to slidly engage the insulated wire (3) between the at least two resilient flexible blades from a necessary or desired direction, or locates the at least two resiliently flexible blades (4) at a desired elevation above the support surface (24) of the stand (9).

As shown by FIGS. 6–9, a non-limiting embodiment of the handle (28) can be configured as a pair of handle members (29)(30) each having first member end (31)(32) coupled to the stand (9) and a second member end (33)(34) each of which can connect (whether fixed or removably) to a handle cross member (35). The handle cross member (35) can be configured as to particular embodiments of the invention as an inverted U shape to provide a hollow mount element (36) (see FIG. 11) in which the at least two flexible blades (4) can be disposed. The hollow mount element (36) can further provide the at least one wire insertion aperture (13) aligned with the at least two flexible blades (4) mounted in the handle cross member (35) to allow an insulated wire inserted through the at least one wire insertion aperture (13) to slidly engage each terminal wire stripper (6) as above-described.

Numerous alternate embodiments of the handle (9) can be configured to locate the at least two flexible blades (4) at a particular location relative to the stand (9) or the support surface (24) or the wire stripper user (2). Certain embodiments of the handle (28) can comprise only a first handle member (29) or only a second handle member (30) to which the handle cross member (35) can be connected to provide access to the force application surface (14) from the left hand side or the right hand side. Understandably, the handle members (29)(30)(35) or the stand (9) can be of any dimension or shape suited to an application or particular type or kind of insulated wire (3) and it is not intended that the invention be limited to the particular configurations shown by FIGS. 6–9. Rather the examples provided are intended to be illustrative of how to make and use the numerous and varied embodiments of the invention including the numerous and varied configurations of the handle members (29)(30)(35).

Figure 7:
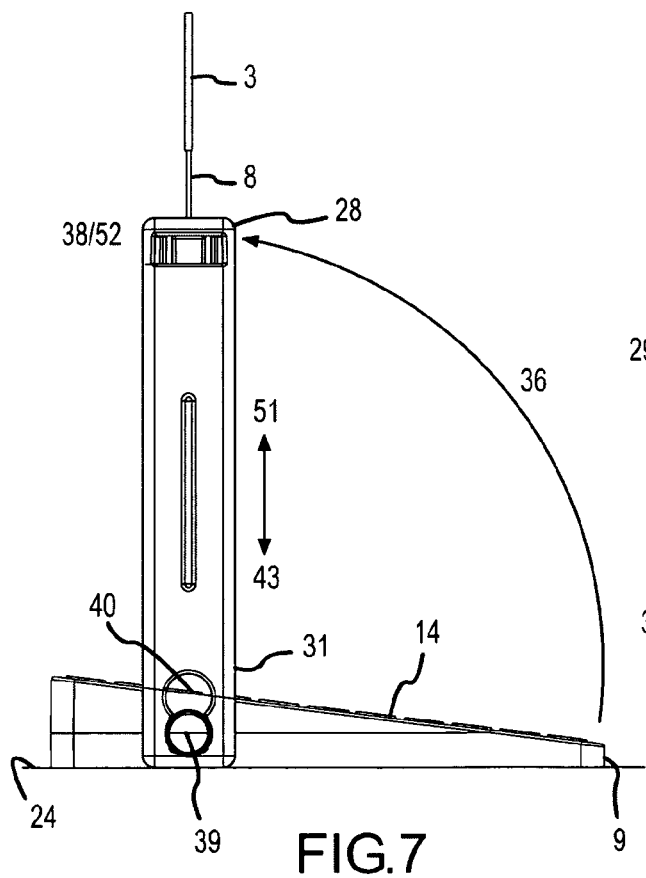
FIG. 7 is a side view of a particular embodiment of the having a rotatable handle established a second fixed location.
Figure 8:
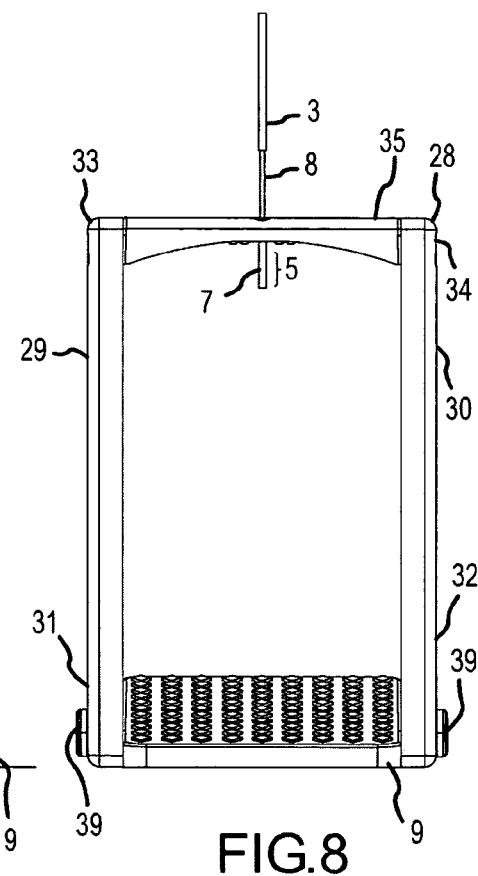
FIG. 8 is a front view of a particular embodiment of the invention having a rotatable handle established a second fixed location.
Figure 9:
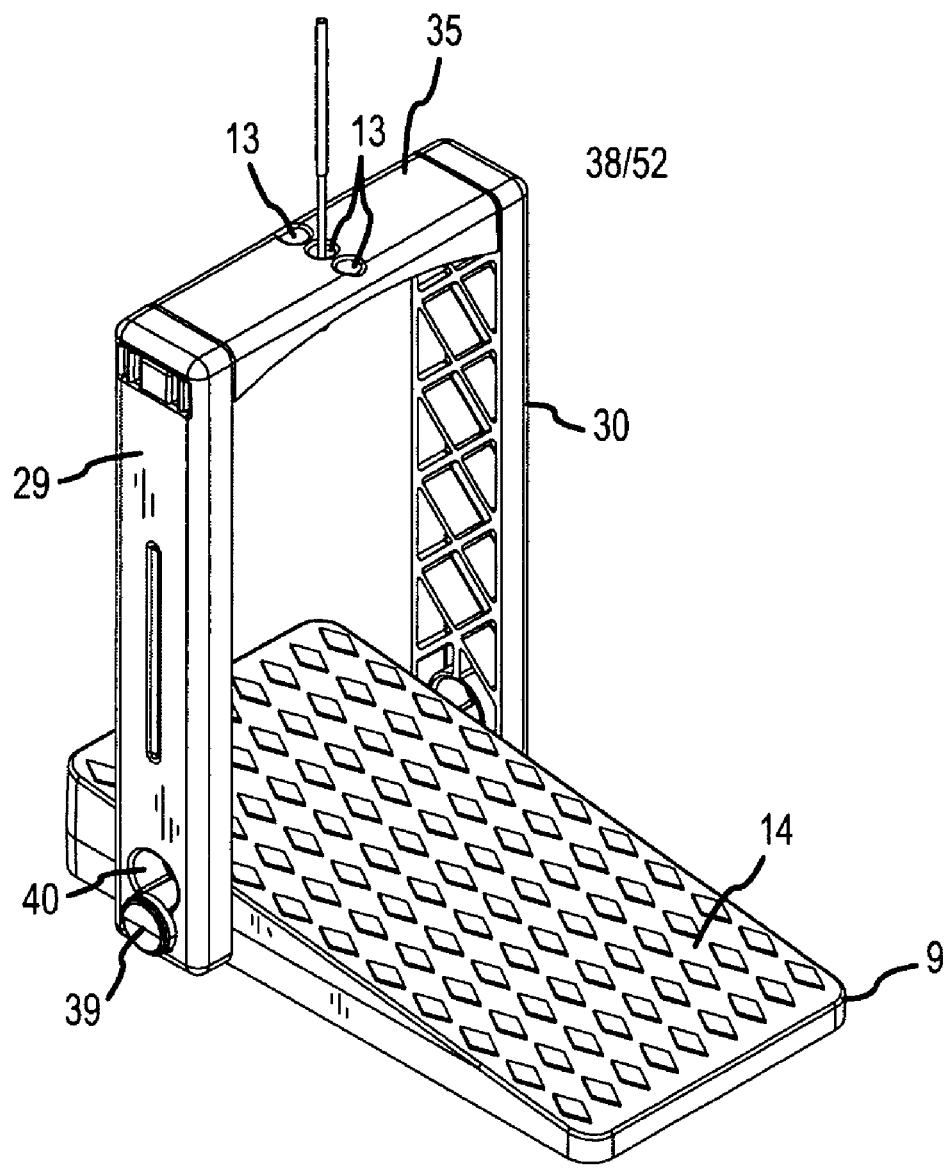
FIG. 9 is a perspective view of a particular embodiment of the invention having a rotatable handle established a second fixed location.
Figure 14:
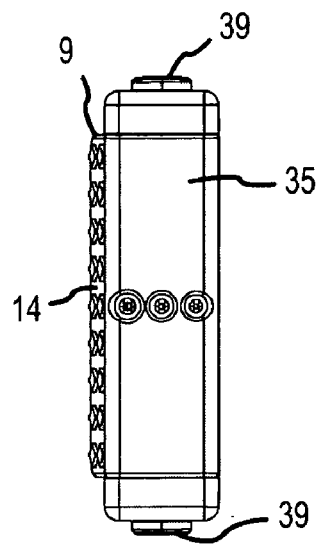
FIG. 14 is a top view of a particular embodiment of the invention having a rotatable handle established a second fixed location.
Figure 15:
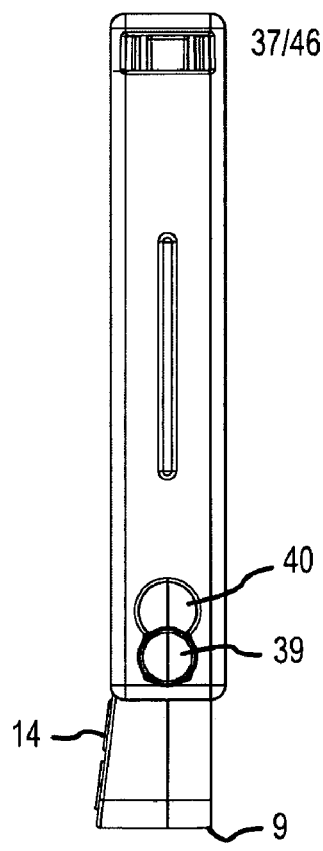
FIG. 15 is a side view of a particular embodiment of the invention having a rotatable handle established a second fixed location.
Figure 16:
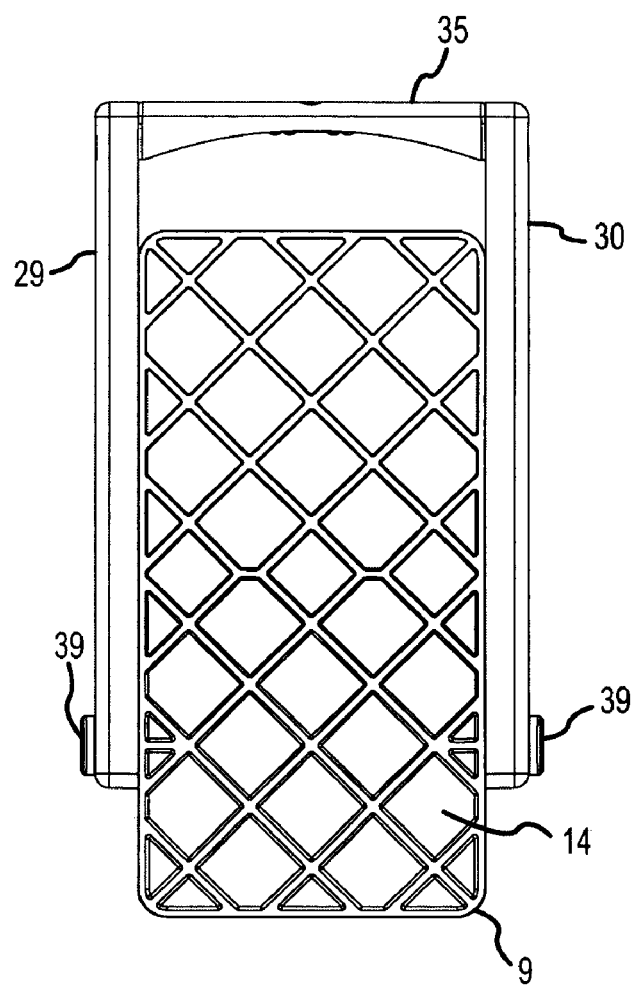
FIG. 16 is a front view of a particular embodiment of the invention having a rotatable handle established a second fixed location.

Embodiments of the handle (28) can be connected to the stand (9) to provide fixed location of the at least two resiliently flexible blades (4), or the handle (28) can be connected to the stand (9) to allow variably adjustable location of the at least two resiliently flexible blades (4). As shown by FIGS. 7 and 9, variably adjustable location of the at least two resiliently flexible blades (4) can be achieved by rotatably coupling the handle (28) to the stand (9) allowing the handle to rotate (36) between a first location (37)(as shown by FIG. 14, 15, 16, 17) and a second location (38) (as shown by FIG. 6, 7, 8, or 9). Regardless of the position of the handle (28) between the first location (37) and the second location (38) the at least two resiliently flexible blades (4) can be utilized as above-described to remove the insulator (7) from a portion of the insulted wire (3).

As to certain embodiments of the invention, the handle (28) can be rotatably coupled to the stand (9) by providing at least one projection (39) coupled to the surface of the stand (9) which can be inserted into a corresponding at least one member rotation aperture (40) of at least one handle member (28) to provide adjustable location of the at least two resiliently flexible blades (4) by rotation of the at least one handle member (29) about the at least one projection (39).

Figure 17:
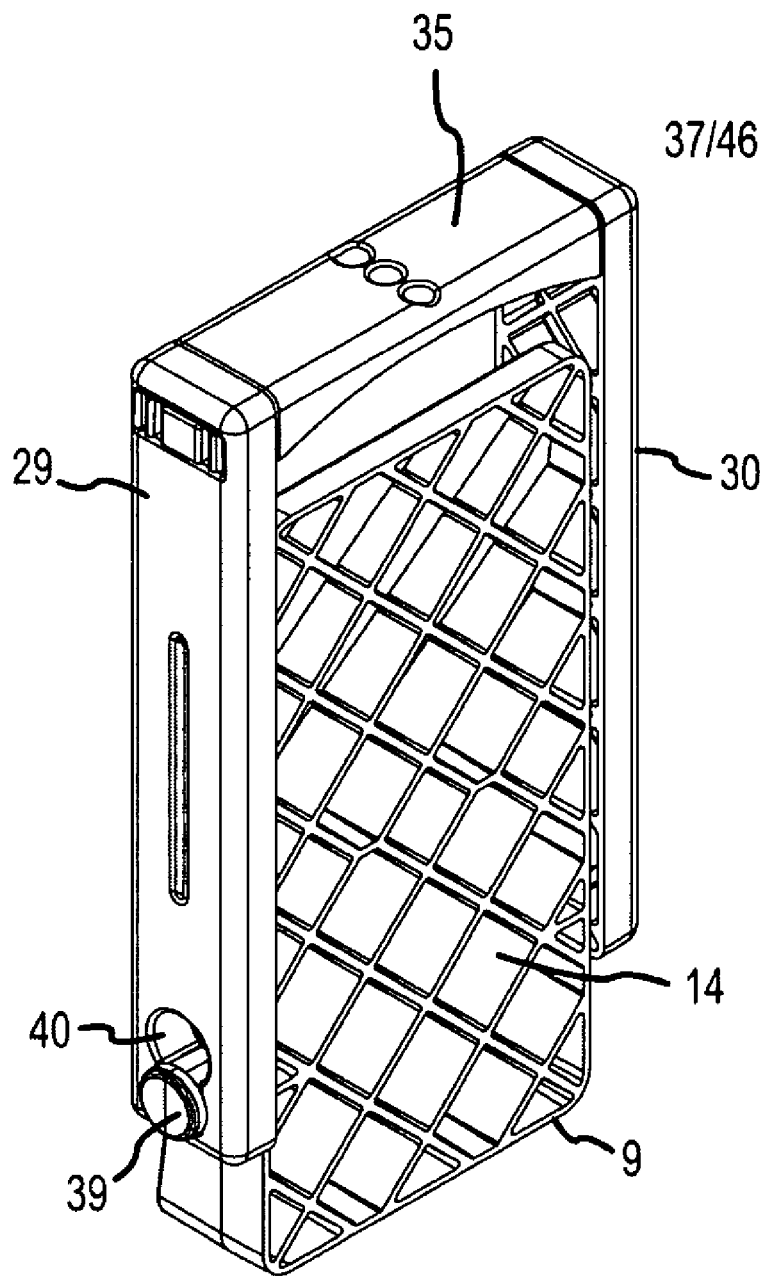
FIG. 17 is a perspective view of a particular embodiment of the invention having a rotatable handle established a second fixed location.
Figure 18:
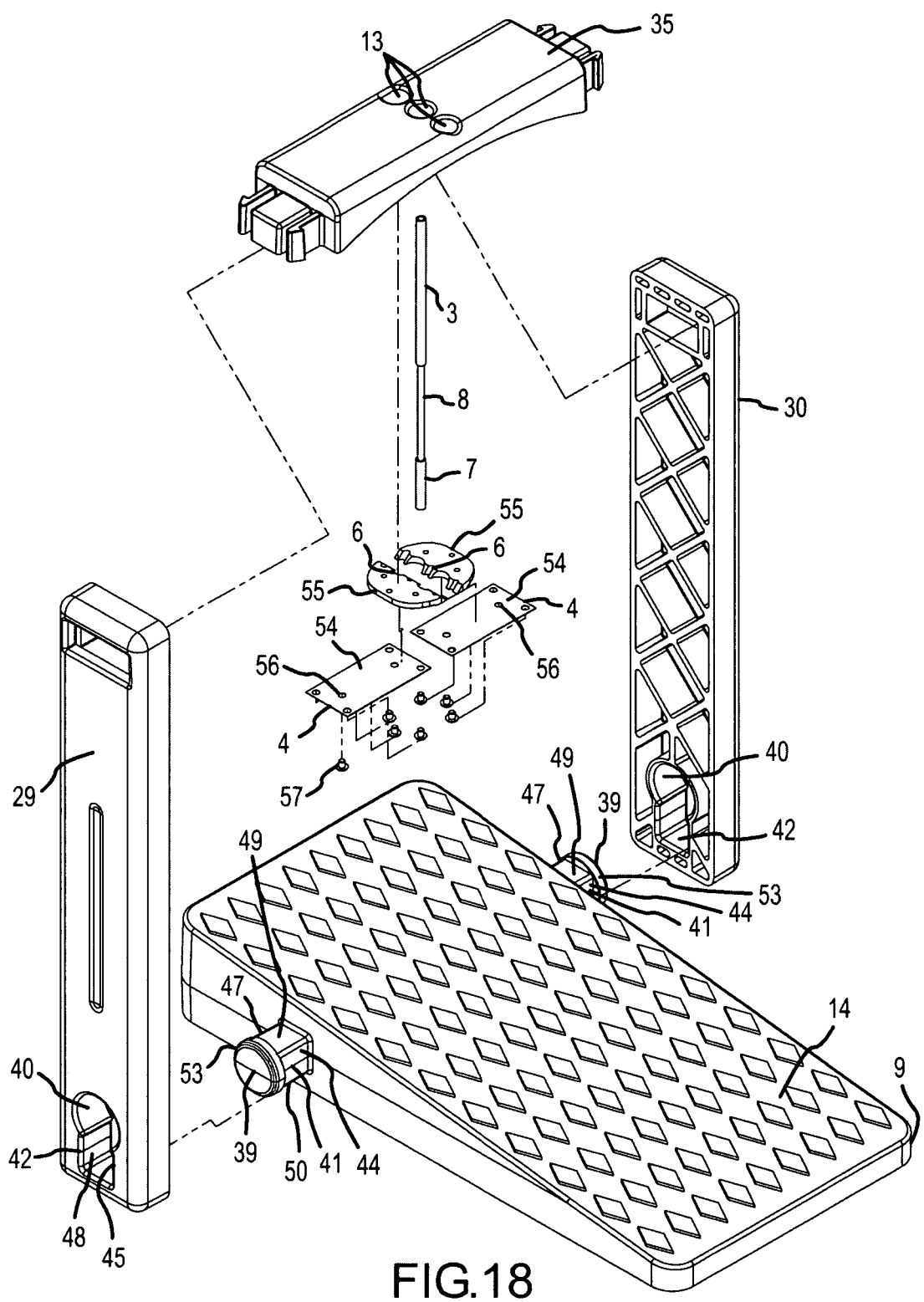
FIG. 18 is an exploded view of a particular embodiment of the invention.

As show by FIG. 18, the at least one projection (39) about which the at least one member (29) rotates can further have at least one flat (41). A rotation lock element (42) can be joined to the at least one member rotation aperture (40) of the first handle member (29) or second handle member (30), or both. The at least one projection (39) can be slidly engaged (43) into the rotation lock element (42), as shown by FIG. 7. The at least one flat (41) of the at least one projection (39) provides a first lock surface (44) and the rotation lock element (42) provides a second lock surface (45) which engage to establish the at least one member (29) in a first fixed location (46) (which can be the same as the first location (37)), such as the first fixed location (46) as shown by FIG. 17. The first fixed location (46) can be established at alternate locations by altering the location of the at least one flat (41) on the at least one projection (39).

Alternate embodiments of the rotation lock element (42) can provide two opposed second lock surfaces (45)(48) which engage two opposed flats (44)(47) of the at least one projection (39)(as shown by FIG. 18) to establish the at least one member (29) in the first fixed location (46), such as the first fixed location (46) shown by FIG. 17.

Alternately, the at least one projection can provide two pairs of opposed flats (44)(47)(49)(50). The first pair of opposed flats (44)(47) can engage the two opposed surfaces (45)(48) of the rotation lock element (42) to fix the location of the at least one member (29) in the first fixed location (46), as above-described.

As shown by FIG. 7, the at least one member (29) can be slidly disengaged (51) from the rotation lock element (42) to allow rotation of the handle (28) between the second location (38) (as shown by FIG. 6, 7, 8, or 9) and the first location (37) (as shown by FIG. 14, 15, 16, 17). As shown by FIG. 7, the second location (38) of the handle (28) can also be the second fixed location (52) by slidly engaging the at least one projection (39) into the rotation lock element (42) to allow the first lock surface (44) of the at least one flat (41) and the second lock surface (45) of the rotation lock element (42) to engage to establish the at least one member (29) in the second fixed location (52). Again, the second fixed location (52) can be the same as the first location (38) or can be a different location depending on orientation of the first lock surface (44) on the at least one projection (39).

Again referring to FIG. 18, each at least one projection element (39) can further include a terminal detent (53) which can be forcibly urged to pass through the least one aperture (40) of at least one handle member (29). Upon passing through the at least one aperture (40) of the at least one handle member (29), the terminal detent (53) interferes with axial travel of the handle member (29) on the at least one projection (39) to retain the at least one member (29) rotatably coupled to the at least one projection (39) during operation of the wire stripper invention (1), as herein described. The terminal detent (53) can be configured as shown or configured similarly or differently so long as the configuration of the terminal detent (53) functions to achieve sufficient interference with axial travel of the at least one handle member (29) to retain the at least one member (29) rotatably coupled to the at least one projection (39).

FIG. 18 also shows an exploded view of a particular embodiment of the at least two resiliently flexible blades (4) each of which terminate in an insulator stripper (6) disposed in opposed relation. It can be understood that the at least two resiliently flexible blades (4) can each further comprise a resiliently flexible element (54) coupled to a substantially inflexible element (55) configured to include the terminal insulator stripper (6).

Now referring to FIGS. 19–26, the resiliently flexible element (54) can comprise a thin sheet of spring steel such as annealed spring steel "50 carbon", annealed spring steel "75 carbon", annealed spring steel "95 carbon", blue tempered steel, "clock spring steel"; or the like, configured to be mounted at a first blade end (56) to the hollow mount element (36) of the stand (9) or the cross member (35) of the handle (28), or otherwise, by a plurality of mechanical fasteners such as self tapping screws (57). However, it is not intended that the resiliently flexible element (54) be limited to the particular configuration of spring steel as shown in FIGS. 19–26 and any material such as a plastic, composite material, or other type of metal can be utilized which affords a configuration (sheet, coil, rod, or otherwise) of suitable resiliency for operation of the wire stripper (1) as above-described.

Alternately, the at least two resiliently flexible blades (4) can be substituted with a substantially inflexible material (not shown) pivotally coupled at each first blade end (56) to the hollow mount element (36) of the handle cross member (35), or otherwise. As to this embodiment of the wire stripper invention (1), the resiliently flexible element (54) can be made responsive to the pivotally coupled substantially inflexible material which allows the user (2) as to this embodiment of the invention to slidly locate an insulated wire (3) between at least two resiliently flexible blades (4) each of which terminate in the insulator stripper (6) disposed in opposed relation to establish a portion of the insulated wire (5) projecting beyond each terminal insulator stripper (6)(similar to as shown by the non-limiting example of FIG. 7). The resiliently flexible element (54)) can without limitation be a coil spring, an elastic band, or a blade of spring steel, or the like to which the substantially inflexible material is responsive to provide the at least two resiliently flexible blades (4).

Now, again referring to FIGS. 19–26, the resiliently flexible element (54) can be coupled to the substantially inflexible element (55) by a plurality of rivets (56) as shown; however, a wide variety of mechanical fasteners can be used to couple or join the substantially inflexible element (55) to the resiliently flexible element (54), such as fasteners having mated spiral threads, screws, self-tapping screws, eyelets, or the like; or by various adhesives or sealants; or by a joining process that produces a coalescence of a portion of the substantially inflexible element (55) to a portion of the resiliently flexible element (54) such as welding; or by soldering, or the like.

As shown by FIGS. 19–26, particular embodiments of the at least two resiliently flexible blades (4) each terminating in a insulator stripper (6) can be disposed in opposed relation in both the open position (FIGS. 20, 22, 24, and 26) which as above-described occurs upon slidly engaging the insulated wire (3) between the at least two resiliently flexible blades (4) and the closed position (FIGS. 19, 21, 23, and 25) which as above-described occurs upon a user (2) acting to remove an insulated wire (3) from between each insulator stripper (6).

As shown the at least two resiliently flexible blades (4) each terminating in a insulator stripper (6) disposed in opposed relation can further include a contoured edge (57) configured to limit engagement of each of the insulator strippers (6) to the insulator (7)(or a portion of the insulator (5) or excise a distance into the insulator (7)) of the insulated wire (3) avoiding substantial engagement of each said insulator stripper (6) with the wire (8) of the insulated wire (3) during release of the insulator (7)(see also FIG. 13 as an example). As to the particular embodiment of the insulator stripper (1) shown, each insulator stripper (6) provides the contoured edge (57) configured as a half circle which in closed opposed relation (as shown for example in FIG. 19) to the other insulator stripper (6) affords a circular aperture (58)(again as shown for example by FIG. 19). The contoured edge (57) of one or both insulator stripper(s)(6) can further include a bevel element (59)(as shown for example by FIG. 20) which terminates at the boundary of the contoured edge (57) to provide a cutter which operates to sufficiently engage, excise, or score the insulator (7) of the insulated wire (3) to allow release of the insulator (7) from the wire (8) of the projecting portion (5) of the insulated wire (3) upon action of the user (2) to remove the insulated wire from the at least two resiliently flexible blades (4).

The contoured edge (57) can have numerous and varied half circle configurations (as shown by FIGS. 19 and 23) to allow the insulator (7) of insulated wire(s) (3) having a wire (8) of lesser or greater diameter in cross section to be suitably scored for release from the wire (8) upon action of the user (2) to remove the insulated wire (3) from the at least two resiliently flexible blades (4). As to certain insulated wires (3) which may include an insulator (7) having more than one insulator layer, the contoured edge (57) can be configured to score only the first insulator layer (not shown) such that only the first insulator layer releases from the insulated wire (3). Alternately, the insulated wire (3) can have two or more wires (8) covered by a single insulator layer or a plurality of insulator layers. As to these embodiments of the invention the contoured edge (57) can be configured to score the insulator (7) to release from the two or more wires (8) of the insulated wire (3), or score the first insulator layer for release from a second insulator layer of the insulated wire (3). In any event, the half circle configuration of the contoured edge (57) and the size of the half circle configuration of contoured edge (57) are not intended to be limiting with respect to the numerous and varied configurations of the contoured edge (57) which can be included in various embodiments of the wire stripper invention (1) to address the correspondingly numerous and varied types and kinds of insulated wire (3) from which the insulator can be released using the wire stripper invention (1) as described.

Now referring primarily to FIG. 27, which shows a case (26) which is the subject matter of United States patent application Ser. No. 11/107,482, hereby incorporated by reference herein, embodiments of the wire stripper invention (1) can be secured in a wire stripper recess element (60). Securement of the wire stripper invention (1) in the wire stripper recess element (60) can be by provision of detents (61), or other mechanical fastener means, which can retain the wire stripper (1) in the wire stripper recess element (60) during operation to release the insulator (7) from a portion of the insulated wire (5) as above-described. While the wire stripper (1) as shown is retained in a wire stripper recess element (60) of the case cover (62), the wire stripper (1) could be retained at any location in the case (26) by detents (61) or mechanical fastener means. Similarly, the wire stripper (1) can be secured to other surfaces such as a cart, table, or the like.

As can be easily understood from the foregoing, the basic concepts of the present invention may be embodied in a variety of ways. The invention involves numerous and varied embodiments of a wire stripper and methods of making and using such wire stripper.

As such, the particular embodiments or elements of the invention disclosed by the description or shown in the figures accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "wire stripper" should be understood to encompass disclosure of the act of "wire stripping"—whether explicitly discussed or not—and, conversely, were there effectively disclosure of the act of "wire stripping", such a disclosure should be understood to encompass disclosure of a "wire stripper" and even a "means for wire stripping." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the veterinary tables herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The claims set forth in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth below are intended describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A wire stripper, comprising:
   (a) a stand;
   (b) a handle rotatably coupled to said stand, wherein said handle rotates between a first location and a second location;
   (c) at least two resiliently flexible blades each having a terminal insulator stripper disposed in opposed relation coupled to said handle, wherein said at least two resiliently flexible blades have sufficient resilient flexure upon engagement with an insulated wire to allow slidable insertion of said insulated wire between each said terminal insulator stripper disposed in opposed relation, and wherein withdrawal of said insulated wire allows sufficient engagement of each said terminal insulator stripper with an insulator of said insulated wire to remove said insulator as said insulated wire is withdrawn from said wire stripper, and wherein said at least two resiliently flexible blades operate at any position of said handle between said first location and said second location.

2. A wire stripper as described in claim 1, wherein each said insulator stripper disposed in opposed relation has a contoured edge configured to limit engagement of said insulator stripper to said insulator of said insulated wire.

3. A wire stripper as described in claim 2, wherein said contoured edge configured to limit engagement of said insulator stripper to said insulator of said insulated wire avoids substantial engagement of each said insulator stripper with a wire of said insulated wire.

4. A wire stripper as described in claim 3, wherein said contoured edge configured to limit engagement of said insulator stripper to said insulator of said insulated wire provides an aperture larger than said wire of said insulated wire.

5. A wire stripper as described in claim 4, wherein said insulator comprises a plurality of insulators, and where in said contoured edge limits engagement of said insulator stripper to fewer than all of said plurality of insulators of said insulated wire.

6. A wire stripper as described in claim 5, wherein operation of said wire stripper removes fewer than all of said plurality of insulators of said insulated wire.

7. A wire stripper as described in claim 6, wherein said insulator comprises a plurality of insulators, and where in said contoured edge limits engagement of said insulator stripper to said plurality of insulators of said insulated wire.

8. A wire stripper as described in claim 7, wherein operation of said wire stripper removes all of said plurality of insulators of said insulated wire.

9. A wire stripper as described in claim 8, wherein said insulated wire comprises at least two wires.

\* \* \* \* \*